United States Patent [19]

Petrick et al.

[11] Patent Number: 5,685,978
[45] Date of Patent: Nov. 11, 1997

[54] RECLAIMING THE CONSTITUENT COMPONENTS OF SEPARATING AND UNCURED CONCRETE

[76] Inventors: Harold W. Petrick, 3407 164th Pl. SE., Bellevue, Wash. 98008; Michael H. Petrick, 9723 164th Ave. NE., Redmond, Wash. 98052

[21] Appl. No.: 339,022

[22] Filed: Nov. 14, 1994

[51] Int. Cl.⁶ .................................................. B01D 35/28
[52] U.S. Cl. .................... 210/241; 210/359; 210/247; 210/499; 209/259; 209/273; 209/249; 209/420; 209/370
[58] Field of Search .................................... 209/352, 370, 209/372, 420, 235, 249, 273, 259; 210/189, 232, 241, 247, 255, 359, 499

[56] References Cited

U.S. PATENT DOCUMENTS

| | | | |
|---|---|---|---|
| 340,484 | 4/1886 | Carrico | 209/273 |
| 342,713 | 5/1886 | Stammer | 209/352 |
| 347,250 | 8/1886 | Millner | 209/352 |
| 393,295 | 11/1888 | Carrico | 209/273 |
| 1,421,809 | 7/1922 | Mischke . | |
| 1,449,837 | 3/1923 | Quirk . | |
| 2,361,946 | 11/1944 | Johnson . | |
| 3,572,505 | 3/1971 | Jongboled . | |
| 4,127,478 | 11/1978 | Miller . | |
| 4,154,671 | 5/1979 | Borges . | |
| 4,192,745 | 3/1980 | Hood . | |
| 4,207,176 | 6/1980 | Hood . | |
| 4,299,695 | 11/1981 | Bostrom . | |
| 4,300,445 | 11/1981 | Hazen . | |
| 4,379,668 | 4/1983 | Pelletier . | |
| 4,572,782 | 2/1986 | Smith et al. . | |
| 4,929,353 | 5/1990 | Harris | 210/241 |
| 5,110,454 | 5/1992 | Parker . | |
| 5,141,650 | 8/1992 | Cavo et al. | 209/273 |
| 5,312,051 | 5/1994 | Preisser . | |

FOREIGN PATENT DOCUMENTS

8081 of 1906 United Kingdom .

*Primary Examiner*—Robert Popovics
*Attorney, Agent, or Firm*—William G. Forster

[57] ABSTRACT

A portable, self-contained concrete reclaimer for use at construction sites to collect, break-down, and transport uncured waste concrete washed from concrete delivery equipment, to recycling facilities for use in the manufacture of fresh concrete. The concrete reclaimer comprises a screen having openings sized to separate aggregate from sand, cement and water when uncured waste concrete is washed thereon. The screen being sized to cover a portion of a water tight reclaiming tank having an open top, a closed wall, a bottom continuously sealed to the closed wall, and an upwardly extending partition disposed therein to divide the reclaiming tank into at least two separate, adjacently disposed compartments including a first receiving compartment adapted to receive and contain sand, cement and water, and an adjacent second receiving compartment adapted to receive and contain aggregate separated therefrom during the concrete washing and reclaiming procedure. The separating screen being pivotable from a first position above the first receiving compartment to direct aggregate into the second receiving compartment while allowing sand, cement, and water to fall therethrough into the first receiving compartment, to a second inverted position over the second receiving compartment to further direct aggregate remaining on the screen into the second receiving compartment.

8 Claims, 4 Drawing Sheets

RECLAIMING THE CONSTITUENT COMPONENTS OF SEPARATING AND UNCURED CONCRETE

BACKGROUND OF THE INVENTION

The present invention relates generally to an apparatus and method for breaking down uncured concrete into its main components, and more particularly to a portable, compact, self-contained device for use at construction sites to collect, separate and transport aggregate, sand, cement, and water reclaimed from discarded, uncured waste concrete.

Until recent times, environmental concerns regarding waste materials discarded at constructions sites were relatively nonexistent. For example, after concrete is delivered to a construction site, trucks and tools employed for the delivery thereof are covered with residual uncured concrete that must be removed before it hardens. Typically, such removal is accomplished by hosing the equipment with water which washes the uncured concrete on to the ground. Accordingly, this method of cleaning causes concrete and the components thereof to seep into the ground. As a result, this practice can pollute ground water in the surrounding areas. Because local environmental laws are now becoming more restrictive, and sometimes prohibit such practices, a need has been created for handling the waste products from the above noted concrete cleaning process. Preferably, the waste concrete can be broken down and separated into its primary components for recycling and reuse in the manufacture of new concrete.

A number of devices have been invented for separating material and particles of varying size into distinct, separate groups. Over the years, screens have been widely employed for this purpose. For example, in 1919 U.S. Pat. No. 1,449,837 issued to Quirk disclosing an ash sifter having an inclined screen that separates coal from ashes into two separate groups. Similarly in 1922, U.S. Pat. No. 1,421,809 issued to Mischke disclosing an ash sifter where cinders and coal are separated from ash that falls through a hood having an inclined screen disposed therein. Consequently, each of these patents are directed to devices that separate only dry particles. Further, such devices deposit the separated particles into collection areas where containment and transportation thereof is not a primary concern.

In 1944, U.S. Pat. No. 2,361,946 issued to Johnson for electrostatic separation of particles. The invention employs electricity in connection with a screen to separate particles of various size. Because electricity is needed to properly operate this invention, its effectiveness for separating moist or saturated particles is greatly reduced.

In 1971, U.S. Pat. No. 3,572,505 issued to Jongbloed disclosing a screening device for use in a wet environment. Jongbloed discloses an invention for sizing particles contained in water by pumping water saturated particles over a screen. Although Jongbloed's invention can be employed in wet environments, it is large and stationary, and cannot be easily transported to multiple sites in a short period of time. Further, Jongbloed's invention does not disclose any means of clearing a screen that may become clogged with wet particles.

Other particle screening inventions include U.S. Pat. No. 4,300,445 to Hazen, and U.S. Pat. No. 5,110,454 to Parker. Hazen discloses a stationary inclined screen for separating curd fines from whey. In contrast, Parker's invention operates independent of a screen. Like Jongbloed, however, each are rather massive and therefore would be difficult to use where portability is required. Moreover, like earlier separating devices, Hazen does not provide a way to clean and clear a clogged screen.

As seen from the foregoing, the cited art is primarily directed to inventions that operate in dry environments, and that employ large stationary equipment in areas where containment and transportation of the separated materials is not a primary concern. Accordingly, a need exists for a portable, compact, self-contained concrete reclaiming device for use at construction sites to collect, separate and transport aggregate, sand, cement, and water reclaimed from discarded, uncured waste concrete.

SUMMARY

One object of the present invention is to provide an environmentally safe means for disposal of uncured waste concrete.

A second object of the present invention is to enable the recycling of unused waste concrete.

A third object is to breakdown unused waste concrete into its primary components, separating the aggregate from the sand, cement, and water.

Another object is to transport unused waste concrete away from construction sites to facilities that can recycle the same.

Yet another object is to prevent unused waste concrete from contaminating soil and ground water.

A further object of the present invention is to collect and recycle water used to clean concrete delivery tools.

A further object of the invention is to prevent the unused waste concrete from entering and plugging domestic sewers, and storm sewers and drains.

Still another object is to comply with environmental regulations.

The invention is a portable, self-contained concrete reclaimer for use at construction sites to collect and break down uncured waste concrete into its primary components of aggregate, sand, water, and cement during a washing procedure. In the washing procedure, a stream of water is employed to wash uncured concrete from tools and concrete delivery equipment, including concrete delivery trucks, into the concrete reclaimer. Following that, the concrete reclaimer is transported to a recycling facility where the aggregate, sand, cement, and water is removed and reused in the manufacture of fresh concrete.

The concrete reclaimer comprises a substantially rectangular reclaiming tank having an open top, a closed wall, and a bottom continuously sealed to the closed wall. Further, the reclaiming tank includes an upwardly extending partition disposed therein to divide the reclaiming tank into at least two separate, adjacently disposed compartments. Included therein is a first receiving compartment adapted to receive and contain sand, cement and water, and an adjacent second receiving compartment adapted to receive and contain aggregate separated therefrom during the concrete washing and reclaiming procedure.

To separate the aggregate from waste concrete, a separating screen is located directly above the first receiving compartment. The separating screen includes a plurality of apertures uniformly spaced, and sized to allow sand, cement, and water to pass through into the first receiving compartment, while directing the aggregate to the second receiving compartment during the washing procedure.

In addition, at least one unloading door is provided to seal an opening provided through the closed wall. A portion of the opening borders the bottom of the reclaiming tank. The unloading door is movable from a closed position that seals the opening to prevent contents contained in the reclaiming tank from escaping through the opening, to an open position that facilitates easy removal of the reclaimed contents including sand, cement, aggregate, and water.

In accordance with another aspect of the invention, the separating screen is pivotable from a receiving position over the first receiving compartment where uncured waste concrete can be received, to an inverted dislodging position over the second receiving compartment where separated aggregate can be deposited in the second receiving compartment.

In accordance with another aspect of the invention, a method is disclosed for reclaiming aggregate, sand, cement and water from uncured waste concrete washed from tools and concrete delivery equipment. In the method, aggregate is separated from a mixture of uncured waste concrete during a washing procedure where water is employed to break down waste uncured concrete into its primary components including aggregate, sand, cement and water. Each component being collected in a concrete reclaimer for transportation to a recycling facility for reuse in the manufacture of fresh concrete.

More specifically, the method comprises the steps of providing a reclaiming tank having an open top, a closed wall, and a bottom continuously sealed to the closed wall of the reclaiming tank. Further, the reclaiming tank includes an upwardly extending partition disposed therein to divide the reclaiming tank into at least two separate adjacently disposed compartments. Included therein is a first receiving compartment adapted to receive and contain sand, cement and water, and a second adjacent receiving compartment adapted to receive and contain aggregate separated therefrom during the concrete washing and reclaiming procedure.

The method further includes placing a separating screen above the first receiving compartment. The separating screen having a plurality of apertures uniformly spaced, and sized to allow sand, cement, and water to pass through into the first receiving compartment, while directing the aggregate into the second receiving compartment during the washing procedure.

At least one unloading door is provided to seal an opening formed in the closed wall, a portion of the opening bordering the bottom of the reclaiming tank. The unloading door being movable from a closed position that seals the opening to prevent contents contained in the reclaiming tank from escaping through the opening, to an open position that facilitates easy removal of the reclaimed contents including sand, cement, aggregate, and water.

Waste uncured concrete is then reclaimed by placing the same on the screen, wherein a stream of water is directed toward the concrete to separate the aggregate from the sand and cement for collection and transportation to a recycling facility such as a concrete batch plant.

The foregoing and other objects, features, and advantages of this invention will become more readily apparent from the following detailed description of a preferred embodiment which proceeds with reference to the accompanying drawings.

DETAILED DESCRIPTION OF PREFERRED EMBODIMENT

FIGS. 1 through 7 show a preferred embodiment of a concrete reclaimer 20 in accordance with the present invention. The concrete reclaimer 20 is provided to enable the separation of uncured waste concrete 22 into its primary components of aggregate 28, sand 30, cement 32, and water 34 for recycling thereof. In brief, uncured waste concrete 22 is received or washed from concrete delivery trucks 24, and related delivery tools such as flop chutes 26 into the concrete reclaimer 20.

The concrete reclaimer 20 includes a reclaiming tank 38 having an open top 40, a closed wall 42, and a bottom 44 continuously sealed to the closed wall 42, i.e. welded thereto. The reclaiming tank 38 is divided into two, equal size, open top, side-by-side, adjacent, water tight, first and second receiving compartments 48–50 by an upwardly extending partition 52. In order to separate the aggregate 28 from sand 30 and cement 32 of uncured waste concrete 22, a separating screen 54 is provided. As will be more fully discussed below, the separating screen 54 is sized to cover one of the receiving compartments: either the first receiving compartment 48 or the second receiving compartment 50. Further, the separating screen 54 is sloped, preferably between 20 and 30 degrees, so that uncured waste concrete 22 received thereon can be broken down by a water stream 58 which causes the sand 30 and cement 32 to fall into the first receiving compartment 48, while causing the larger sized aggregate 28 to advance into the second receiving compartment 50. Further, the concrete reclaimer 20 is configured so that the separating screen 54 can pivot approximately about the upper edge of the partition 52 from a position over the first receiving compartment 48, to an inverted dislodging position over the second receiving compartment 50 for dislodging aggregate 28 and depositing the same into the second receiving compartment 50. To unload the reclaimed concrete components from the concrete reclaimer 20, water-tight unloading doors 68–70 are provided, one for each receiving compartment 48–50.

Considering now in more detail the structure of the concrete reclaimer 20, the preferred embodiment includes a reclaiming tank 38 constructed primarily of plate steel of various thickness ranging from 3/16" to 1/4" to form a endless, continuous closed wall 42 that is continuously sealed to a bottom 44 by welding the same together at the joint where the bottom 44 and the closed wall 42 come together. Further, the closed wall 42 comprises a pair of opposing endwalls 62–64, and a pair of opposing sidewalls 66–67. Thus, the closed wall 42 is constructed of four separate pieces, i.e., two endwalls 62–64 and two sidewalls 66–67 welded together to form a rectangular reclaiming tank 38. As will be more fully explained below, matching unloading doors 68–70 are installed on the endwalls 62–64, one on each endwall. The unloading doors 68–70 facilitate unloading the separated concrete components for recycling at a recycle center (not shown).

In addition, a pair of symmetrically formed pivot brackets 76, (only one is shown) are disposed above the partition 52, adjacent each sidewall 66–67. The pivot brackets 76 are provided to form a pivot point for the separating screen 54, and to provide support thereof against sliding. As will be more fully discussed below, each pivot bracket 76 includes a notch 78 formed about the vertical center line of the pivot bracket 76. The notch 78 is formed by removing equal portions of the pivot bracket 76 on either side of its vertical center line. Thus, the removed portions form a notch that is symmetrical in relation to the partition 52. In this way, the separating screen 54 can be positioned to extend slightly past the partition 52 so that aggregate 28 moving down the separating screen 54 is prevented from entering the first receiving compartment 58. This configuration also allows the separating screen 54 to be similarly employed over either the first receiving compartment 48, or the second receiving compartment 50.

Because the reclaiming tank 38 is constructed primarily of steel plate, portions thereof are stiffened for added strength. For example, the top edge of the closed wall 42 is manufactured to form a continuous reinforced perimeter lip 80. In this way, improved resistance to bending and torsional forces imposed on the concrete reclaimer 20 is achieved. In the preferred embodiment, the perimeter lip 80 is formed on the top edge of each sidewall 66–67, and in each endwall 62–64 prior to assembly. Further, a pair of channels 82–83 are welded to the bottom 44 of the reclaiming tank 38. The channels 82–83 are located at approximately the middle of each receiving compartment 48–50, and extend across the bottom 44 between the sidewalls. In addition to stiffening the bottom 44, the channels 82–83 raise the concrete reclaimer 20 from the ground a distance that enables the use of a fork lift to lift and move the same to various locations around a construction site. Additionally, gussets 84–85 are welded to the back of each end of each channel 82–83, and similarly welded to the bottom 44 to support and maintain each channel in a vertical position.

To facilitate moving and transporting the concrete reclaimer 20 by lifting lines (not shown), four identical lifting lugs 86 are welded to the reclaiming tank 38, near each corner thereof, on the inside surface. As illustrated, a hole is provided through each lifting lug 86 so that lifting lines (not shown) can be tethered to the lifting lugs 86 for lifting the concrete reclaimer 20 to a flatbed truck (not shown) or the like.

Directing attention to FIGS. 1 through 5, a retention bar 88 is illustrated atop the concrete reclaimer 20. A retention bar 88 is provided to assist an operator of a concrete delivery truck 24 to properly position its flop chute 26 over the concrete reclaimer 20, thereby preventing the same from traveling too far over the reclaiming tank 38. The retention bar 88 is constructed of tubular steel and is mounted into a bar mounting bracket 90 constructed of similar, slightly larger steel tube. The bar mounting bracket 90 is welded to a steel angle 92 that is fixedly attached to the perimeter lip 80. To facilitate removal and/or replacement of the retention bar 88, removable fasteners 94 slide through coaxially disposed holes provided through the mounting bracket 90 and the retention bar 88.

Figure 3:
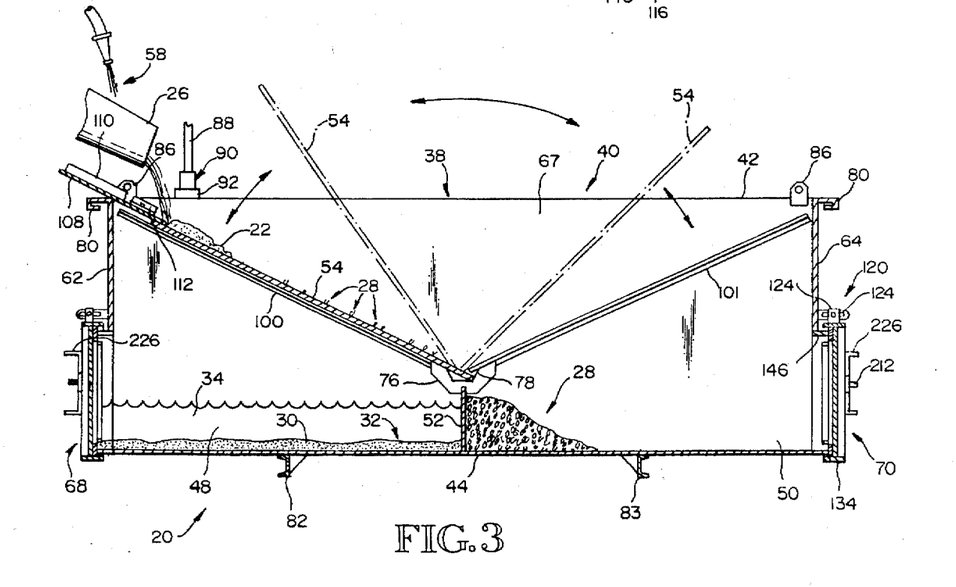
FIG. 3 is a cross-sectional view taken through the center of a concrete reclaimer with the separating screen in the receiving position; the phantom lines illustrating movement of the separating screen, back and forth from the receiving position to the inverted dislodging position.
Figure 5:
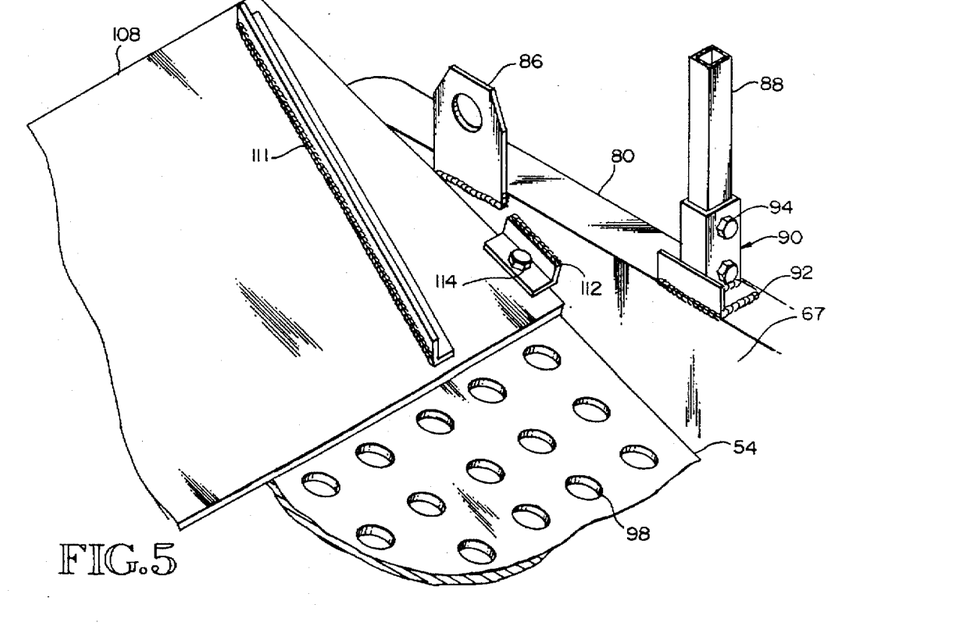
FIG. 5 is an enlarged fragmentary view of a receiving platform secured to a reclaiming tank, overlapping the top portion of a separating screen.

Returning again now to FIG. 3, a separating screen 54 is illustrated in the receiving position over the first receiving compartment 48. In the preferred embodiment, the separating screen 54 is manufactured of standard 3/16 inch thick hardware cloth sized to cover only one receiving compartment. The separating screen 54 includes a plurality of uniformly disposed holes: either round screen holes 98, or elongated-slotted screen holes 99 (FIG. 5). Typically, the dimension of round screen holes is 3/16" diameter. The slotted screen holes 99 may be slightly larger in the elongated direction. The separating screen 54 is supported in a sloped position, preferably 20 to 30 degrees, by a pair of opposing screen support angles 100, one welded to each opposing sidewall 66–67. Because FIG. 3 is a cross-section, it should be noted that only one angle of the pair is shown. As disclosed above, the separating screen 54 can pivot about the partition 52 from a position over the first receiving compartment 48, to an inverted dislodging position over the second receiving compartment 50. This pivoting action is illustrated by phantom lines and arrows representing the back and forth movement of the separating screen 54. For support of the separating screen 54, when it is pivoted to the inverted dislodging position over the second receiving compartment 50, a similar second pair of screen support angles 101 are provided for support thereof. Like screen support angles 100, screen support angles 101 are welded to opposing sidewalls 66–67, sloping down to the partition 52. As noted above, only one such angle of the pair of screen support angles 101 can be seen because the view is a cross section.

In addition to providing support for the separating screen 54, screen support angles 100 and 101 provide a connection point for each pivot bracket 76. As illustrated, a pivot bracket 76 is attached (welded) to the partition 52, adjacent the sidewall 67. The pivot bracket 76 extends symmetrically upward and is welded to support angles 100 and 101 on either side of the notch 78. It should be appreciated that support angles 100 and 101 do not extend into the space defining the notch 78. In this way, the separating screen 54 can extend into the notch 78 unobstructed.

Figure 1:
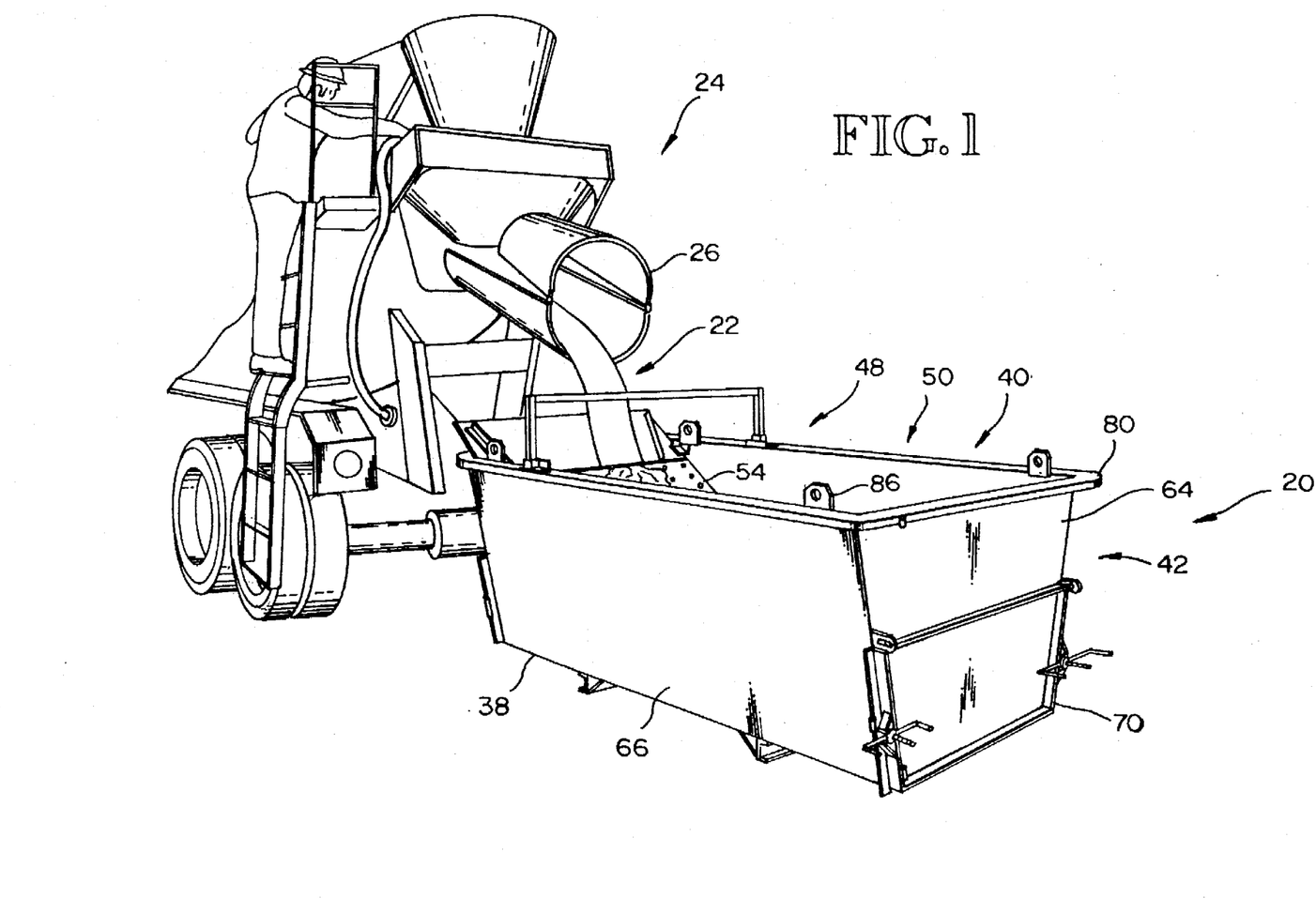
FIG. 1 is a perspective view of a concrete reclaimer receiving waste uncured concrete washed from a concrete delivery truck, down the flop chute, into the concrete reclaimer for separation and transportation to a recycling center for recycling of aggregate, sand, water and cement.
Figure 2:
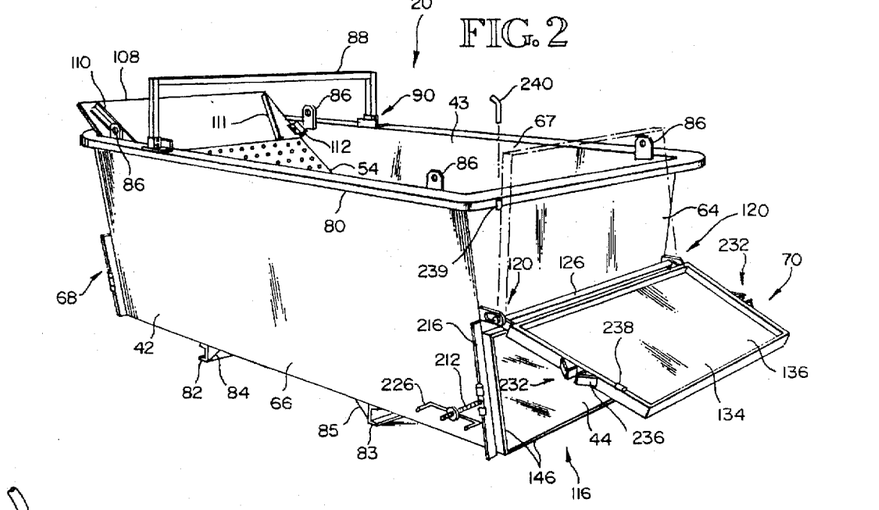
FIG. 2 is a perspective view of a concrete reclaimer having one of its unloading doors partially open with the unloading door locking assembly pivoted to the open position, the phantom lines illustrating the unloading door in the fully open position, and being retained in that position by a retaining pin that is coaxially disposed through retaining sleeves.

As illustrated in FIGS. 1–3, a receiving platform 108 is disposed above the endwall 62 of the first receiving compartment 48. The receiving platform 108 is provided as a receiving area for uncured waste concrete 22. The receiving platform 108 is disposed over the separating screen 54, closely overlapping the same, and extends upward and outward past the endwall 62. Two concrete guides 110–111 disposed on opposite sides of the receiving platform 108 are provided to channel uncured waste concrete 22 onto the separating screen 54. The receiving platform 108 is secured in place by retaining angles 112 having removable securing pins 114, i.e., bolts, extending therethrough as best illustrated in FIG. 5 (only one of each is shown). Thus to remove the receiving platform 108, the securing pins 114 are removed to enable the receiving platform 108 to slide outward from the concrete reclaimer 20. Once the receiving platform 108 is so removed, the separating screen 54 can be pivoted to an inverted dislodging position over the second receiving compartment 50 for dislodging aggregate 28 and depositing the same therein.

Directing attention to FIGS. 2–4 and 7, unloading doors 68–70 are illustrated hingedly connected to the reclaiming tank 38. Each unloading door 68–70 is alike in its arrangement, construction and connection to the reclaiming tank 38. In this way, the unloading doors 68–70 are interchangeable. Moreover, each unloading door 68–70 is sized to cover an opening formed in the lower portion of each endwall 62–64. For example, unloading door 70 is disposed to cover opening 116 which is formed in the endwall 64 by removing a lower rectangular portion thereof disposed between the sidewalls 66–67.

It should be appreciated that unloading doors 68–70 so connected are attached by an expandable hinge assembly 120 that allows the entire door, i.e., every portion thereof, to move horizontally away from the reclaiming tank 38, in a direction normal to the reclaiming tank 38, as well as pivot upward to a fully open position. As will be more fully discussed below, this arrangement permits one to apply uniform sealing pressure to the unloading door when it is locked in a closed, sealed position.

For example, this arrangement is accomplished on endwall 64 by fixedly attaching (welding) opposing slotted hinge brackets 122 to the reclaiming tank 38: one slotted hinge bracket being located adjacent each sidewall 66–67, just above the opening 116. The hinge brackets 122 are positioned so that the slots formed therethrough extend horizontally to allow horizontal sliding movement, normal to the endwall 64, of a hinge pin 126. Similarly, a pair of opposing hinge plates 124 are fixedly attached (welded) to the upper surface of the unloading door 70. The opposing hinge plates 124 each include a hole (not shown) sized to receive a hinge pin 126. In this way, an unloading door 70 disposed to cover an opening 116 is hingedly attached to the reclaiming tank 38 when a hinge pin 126 is received through the slotted hinge brackets 122, and likewise through the hinge plates 124. A hinge pin 126 so received defines a pivot axis 127 for the unloading door 70 that is slidable in a horizontal direction, normal to the reclaiming tank 38. Accordingly, the unloading door 70 has a movable pivot axis 127.

To secure the hinge pin 126 in place, ordinary means of fastening can be employed. For example, a pair of washers 130 is illustrated, one being placed over each end of the hinge pin 126. To prevent the hinge pin 126 from movement in the direction of the pivot axis, fasteners such as threaded nuts (not shown), or E-clips (not shown) can be employed.

Figure 7:
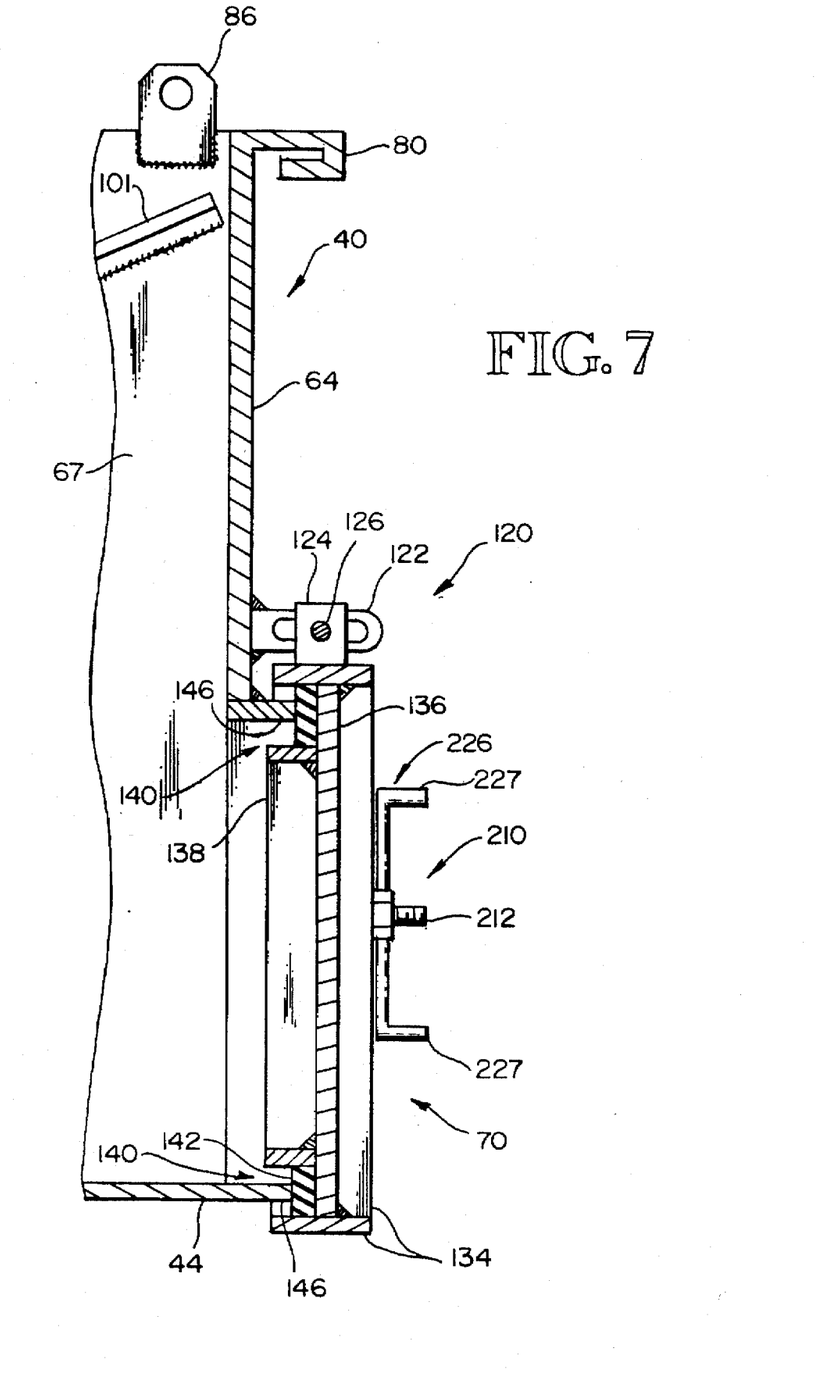
FIG. 7 is an enlarged fragmentary cross-sectional view taken through an endwall of a concrete reclaimer with the unloading door in the closed position.

Each unloading door 68–70 includes a door frame 136 constructed of steel bar stock material bent to form the shape of a rectangle. It should be appreciated, however, that other techniques of construction may be more efficient. For example, the door frame 136 could be fabricated from four separate pieces of steel bar welded together to form the sides of a rectangle. Fitted inside the door frame 136 is a steel plate door panel 138 centrally disposed, and continuously welded to the door frame 136. To produce a sealed, water tight fit between the unloading door 70 and the reclaiming tank 38, a rubber gasket 142 is fitted between the unloading door 70, and the reclaiming tank 38. To hold the rubber gasket in place, a rectangular steel gasket retaining fence 138 is welded to the door panel 138, on the inside thereof, i.e., to the side facing the reclaiming tank 38 as illustrated in FIG. 7. Like the door frame 136, the gasket retaining fence 138 is constructed of steel bar stock material similarly bent to form the shape of a rectangle, but slightly smaller in size. The gasket retaining fence 138 is concentrically aligned in relation to the door frame 136 on the door panel 136. In this way, a continuous channel 140 is formed between the door frame 136 and the gasket retaining fence 138 in which the rubber gasket 142 is secured. It should be appreciated that the rubber gasket is continuous around the entire channel 140. Further, in the preferred embodiment, the rubber gasket 142 is made from four separate, oversized pieces of rubber that must be slightly compressed to fit in the channel 140. In this way, an improved water tight seal is attained.

To produce a sealed fit between the unloading door 70 and the reclaiming tank 38, a sealing lip 146 is formed around the opening 116. The sealing lip 146 protrudes from the opening 116 to engage the rubber gasket 142 when the unloading door 70 is in the closed position. Like the door frame 134, the sealing lip 146 is constructed of steel bar stock material fabricated to form a rectangle, and is welded to the opening 116 to form a water tight seal. In the preferred embodiment, the sealing lip 146 is formed by extending the bottom 44 of the reclaiming tank 38 a sufficient distance to engage the rubber gasket 142 when the unloading door 70 is in the closed position.

Returning again to FIGS. 2 and 4, a locking assembly 210 is illustrated. A locking assembly 210 is provided to bias the unloading door 70, and rubber gasket 142 against the sealing lip 146 thereby maintaining the unloading door 70 in the closed, water tight, sealed position so that liquids and solids in the reclaiming tank 38 are contained therein. To so bias the unloading door 70, pressure is imparted against the unloading door 70 toward the reclaiming tank 38, by a locking assembly 210. As will be seen, four locking assemblies are included in the preferred embodiment: two for each unloading door 68–70.

Included therein is a threaded clamping bolt 212 hingedly received by a clamp hinge 214. The clamp hinge 214 is slightly separated from the reclaiming tank 38 by a connection flange 216 that is welded to the reclaiming tank 38. Like many of the components of the unloading doors 68–70 and the reclaiming tank 38, the connection flange 216 is fabricated from steel bar stock, and is welded to the reclaiming tank 38 adjacent the opening 116. In the preferred embodiment, the clamp hinge 214 comprises a hinge rod 218 rotatably secured to the connection flange 216 by opposing spaced-apart hinge sleeves 220–222. In this way, a clamping bolt 212 fixedly attached (welded) to the hinge rod 218, between the hinge sleeves 220–222 can pivot about a vertical axis defined by the hinge rod 218.

To seal the unloading door 70 in the closed position, a clamp handle 226 is threadably mounted to the clamping bolt 212. Typically, a clamp handle 226 comprises opposing steel rods bent 90 degrees at the ends, extending from a clamp nut 228. The rods 227 are welded to the clamp nut 228. The clamp nut 228 includes a clamp washer 230 coaxially attached (welded) thereon. Wherein the clamp handle 226 threadably engages the clamping bolt 212, and is advanced, by rotation of the clamp handle 226, along the clamping bolt 212 against a keeper assembly 232 welded to an unloading door 70.

A keeper assembly 232 is provided to receive and engage the clamping bolt 212, and to transfer clamping forces imparted from the same to the unloading door 70 thereby biasing the unloading door 70 toward the reclaiming tank 38. Thus, the clamping bolt 212 engages the keeper assembly 232 so that clamping forces can be imparted thereon. To impart such clamping forces, the clamp nut 228 and clamp washer 230 are urged against a keeper assembly 232 attached (welded) to the door frame 134 of the unloading door 70. A keeper assembly 232 is fabricated from steel bar material and includes two horizontal, spaced-apart keeper plates 234. As can best be seen in FIG. 4, the keeper plates 234 are spaced apart to receive a clamping bolt 212 therebetween. To reinforce and strengthen the keeper plates 234 against any movement relative to the door frame 134, a pair of brace plates 236 are welded to the keeper plates 234, one brace plate 236 to each keeper plate 234. The brace plates 236 extend from the keeper plates 234 at a 45 degree angle to the door frame 134 where it is similarly welded thereto. In the fabricating process, it may be more efficient to weld the keeper plates 234, and brace plates to a base plate 237 which is then welded to the door frame 134 as illustrated in FIG. 4.

Figures 4, 6:
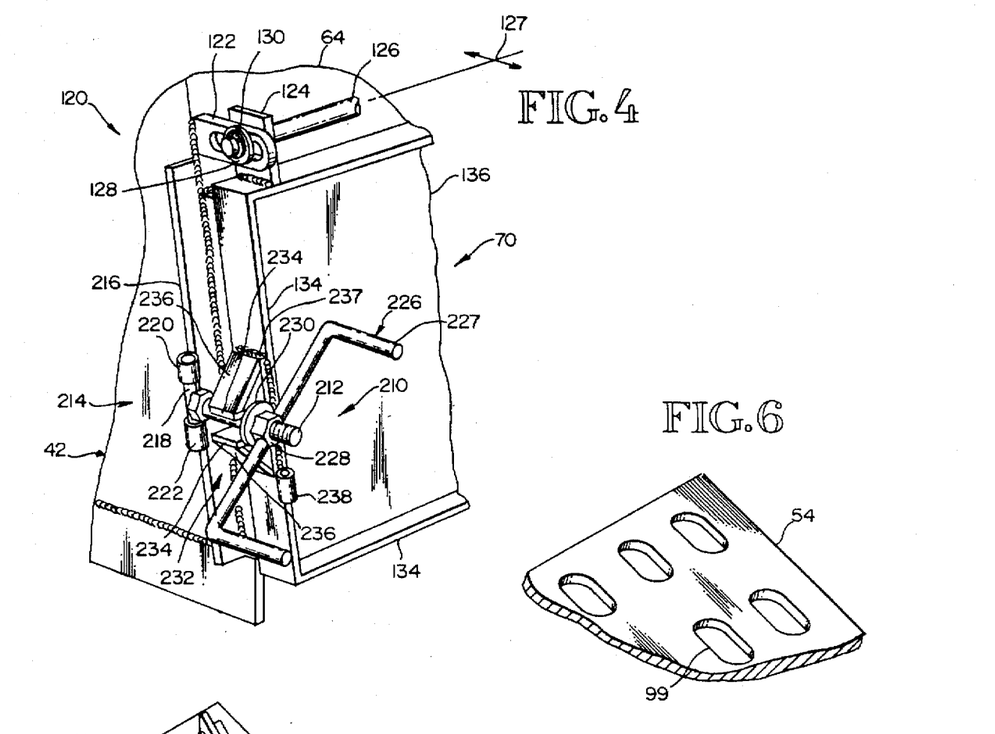
FIG. 4 is an enlarged fragmentary view of an unloading door secured in the closed position by an unloading door locking assembly, wherein the receiving compartment is sealed.
FIG. 6 is an enlarged fragmentary view of a separating screen made from hardware cloth sheets of steel having elongated holes.

Thus, to seal an unloading door 70 to the reclaiming tank 38, the unloading door 70 is pivoted to the closed position as best shown in FIGS. 3, 4, and 7. Then the clamping bolt 212 of a locking assembly 210 is pivoted to a position where the clamping bolt 212 engages the keeper assembly 32. The clamp handle 226 is then rotated to urge the clamp nut 228 toward the reclaiming tank 38 wherein the unloading door 70 is likewise urged toward the reclaiming tank 38 until the rubber gasket 142 engages and presses against the sealing lip 146.

Although only one unloading door 70, and one locking assembly 210 are discussed above, it should be appreciated that each unloading door 68–70 is identical, and that four identical locking assemblies 210 are provided: two for each unloading door 68–70. Thus, a pair of locking assemblies 210 are required to maintain one unloading door 70 in the closed position: one locking assembly 210 on either side of the unloading door, adjacent the sidewall. In this way, when a pair of locking assemblies 210 are simultaneously operated to seal an unloading door 70, the clamping forces on the unloading door 70 are equal and balanced. Further, because the unloading door 70 pivots from an expandable hinge assembly 120, no restriction is encountered when the unloading door 70 is closed and the locking assemblies 210 are operated to seal the same. As such, the rubber gasket 142 engages the sealing lip 146 with approximately equal sealing force around the entire rubber gasket 142.

Returning now to FIG. 2, in order to unload and remove aggregate 28, sand 30, cement 32 and water 34 from the concrete reclaimer 20, the unloading doors must be maintained in an open position as shown by the phantom lines in FIG. 2. As can be seen, the open position is obtained by pivoting the unloading door 70 approximately 180 degrees to a position adjacent the perimeter lip 80. To maintain this position, two retaining sleeves 238–239 are employed. One retaining sleeve 239 is welded to the perimeter lip 80 with the axis thereof oriented vertically. Wherein the other retaining sleeve 238 is welded to the door frame 134 of the unloading door 70, below the keeper assembly 232, such that when the unloading door 70 is in the open position, the retaining sleeve 238 is coaxially disposed in relation to the axis of retaining sleeve 239. In this way, when the unloading door 70 is in the open position, the coaxially aligned retaining sleeves 238–237 can receive a retaining pin 240 therein to maintain the open position.

In operation, a concrete reclaimer 20 is transported to a construction job site and placed at location close to concrete pouring activities. Then, once a concrete delivery truck finishes placing a load of concrete, it backs up to a concrete reclaimer 20 to a position where the end of its flop chute 26 is within approximately 18 inches of the retention bar 88, preferably over the receiving platform 108. The flop chute 26, and other delivery equipment can then be washed with a stream of water 58 usually supplied from the concrete delivery truck.

The uncured waste concrete 22 is then washed onto the receiving platform 108 and then onto the separating screen 54. Because the concrete is uncured, the stream of water 58 breaks down the concrete and washes the sand 30, cement 32, and water 34 through the openings in the separating screen 54 into the first receiving compartment 48. Because the screen holes 98 or screen slotted holes 99 in the separating screen 54 are sized smaller than the aggregate, the aggregate advances down the sloped separating screen 54 into the second receiving compartment 50.

To prevent the sand 30, cement 32, and water 34 from setting up and hardening in the concrete reclaimer 20, a retarding agent is typically added to both receiving compartments 48–49. Any commercially available concrete retarding product (not shown) can be employed. Then, when the concrete delivery trucks finish pouring concrete at a job site, the concrete reclaimer 20 is loaded on a truck (not shown) and transported to a recycling center which is usually the same facility where concrete is initially mixed before being sent to a job site. Finally, the concrete reclaimer 20 is moved to a designated area where the unloading doors are opened and the contents removed.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

That which is claimed is:

1. A portable, self-contained concrete reclaimer for use at construction sites to collect and break down uncured waste concrete into its primary components of aggregate, sand, water, and cement during a washing procedure where a stream of water is employed to wash uncured concrete from tools and concrete delivery equipment into the concrete reclaimer for transportation to a recycling facility for reuse in the manufacture of fresh concrete, the concrete reclaimer comprising:

a reclaiming tank having an open top, a closed wall, and a bottom continuously sealed to the closed wall of said reclaiming tank, said reclaiming tank having an upwardly extending partition disposed therein to divide said reclaiming tank into at least two separate adjacently disposed compartments including a first receiving compartment adapted to receive and contain sand, cement and water, and an adjacent second receiving compartment adapted to receive and contain aggregate separated therefrom;

a separating screen disposed above the first receiving compartment, said separating screen adapted to receive waste uncured concrete for separating aggregate therefrom during the washing procedure;

at least one unloading door attached to the closed wall of the reclaiming tank, said at least one unloading door being movable from a closed position that covers and seals an opening formed through the closed wall to prevent contents contained in the reclaiming tank from escaping through the opening, to an open position that facilitates removal of the reclaimed contents including sand, cement, aggregate, and water;

a receiving platform removably attached to the reclaiming tank, said receiving platform disposed adjacent the separating screen, extending over the closed wall of the reclaiming tank;

an expandable hinge assembly mounted to the reclaiming tank, said expandable hinge assembly pivotally connecting said at least one unloading door to the closed wall of the reclaiming tank, wherein said expandable hinge assembly enables the unloading door to pivot about a pivot axis from a closed position for sealing the opening, to an open position for unloading the concrete reclaimer;

wherein the expandable hinge assembly further comprises a hinge pin that defines the pivot axis of the unloading door, and at least one slotted hinge bracket being attached to the reclaiming tank to slidably receive said hinge pin, said hinge pin being slidable in a direction normal to the closed wall of the reclaiming tank.

2. A portable concrete reclaimer as recited in claim 1 wherein the separating screen is pivotable from a receiving position over the first receiving compartment where uncured waste concrete can be received, to an inverted dislodging position over the second receiving compartment where separated aggregate can be deposited in the second receiving compartment.

3. A portable concrete reclaimer as recited in claim 2 wherein the separating screen is pivotable about a horizontal pivot axis disposed substantially between the first and second receiving compartments.

4. A portable, self-contained concrete reclaimer for use at construction sites to collect and break down uncured waste concrete into its primary components of aggregate, sand, water, and cement during a washing procedure where a stream of water is employed to wash uncured concrete from tools and concrete delivery equipment into the concrete reclaimer for transportation to a recycling facility for reuse in the manufacture of fresh concrete, the concrete reclaimer comprising:

a reclaiming tank having an open top, a closed wall, and a bottom continuously sealed to the closed wall of said reclaiming tank, said reclaiming tank having an upwardly extending partition disposed therein to divide said reclaiming tank into at least two separate adjacently disposed compartments including a first receiving compartment adapted to receive and contain sand, cement and water, and an adjacent second receiving compartment adapted to receive and contain aggregate separated therefrom during the concrete washing and reclaiming procedure;

a separating screen disposed above the first receiving compartment, said separating screen adapted to receive waste uncured concrete for separating aggregate therefrom during the washing procedure;

a receiving platform removably attached to the reclaiming tank, said receiving platform disposed adjacent to the separating screen, extending over the closed wall of the reclaiming tank;

a removable retention bar disposed above the reclaiming tank for properly positioning the concrete delivery equipment;

an expandable hinge assembly mounted to the reclaiming tank, said expandable hinge assembly pivotally connecting said at least one unloading door to the closed wall of the reclaiming tank, wherein said expandable hinge assembly enables the unloading door to pivot about a pivot axis from a closed position for sealing the opening, to an open position for unloading the concrete reclaimer;

wherein the expandable hinge assembly further comprises a hinge pin that defines the pivot axis of the unloading door, and at least one slotted hinge bracket being attached to the reclaiming tank to slidably receive said hinge pin, said hinge pin being slidable in a direction normal to the closed wall of the reclaiming tank.

5. A portable concrete reclaimer as recited in claim 4 wherein the separating screen is pivotable from a receiving position over the first receiving compartment where uncured waste concrete can be received, to an inverted dislodging position over the second receiving compartment where separated aggregate can be deposited in the second receiving compartment.

6. A portable, self-contained concrete reclaimer for use at construction sites to collect and break down uncured waste concrete into its primary components of aggregate, sand, water, and cement during a washing procedure where a stream of water is employed to wash uncured concrete from tools and concrete delivery equipment into the concrete reclaimer for transportation to a recycling facility for reuse in the manufacture of fresh concrete, the concrete reclaimer comprising:

a reclaiming tank having an open top, a closed wall, and a bottom continuously sealed to the closed wall of said reclaiming tank, said reclaiming tank having an upwardly extending partition disposed therein to divide said reclaiming tank into at least two separate adjacently disposed compartments including a first receiving compartment adapted to receive and contain sand, cement and water, and an adjacent second receiving compartment adapted to receive and contain aggregate separated therefrom during the concrete washing and reclaiming procedure;

a separating screen disposed above the first receiving compartment, said separating screen adapted to receive waste uncured concrete for separating aggregate therefrom during the washing procedure;

at least one unloading door attached to the closed wall of the reclaiming tank, said at least one unloading door being movable from a closed position that covers and seals an opening formed through the closed wall to prevent contents contained in the reclaiming tank from escaping through the opening, to an open position that facilitates removal of the reclaimed contents including sand, cement, aggregate, and water; and an expandable hinge assembly mounted to the reclaiming tank, said expandable hinge assembly pivotally connecting said at least one unloading door to the closed wall of the reclaiming tank, wherein said expandable hinge assembly enables the unloading door to pivot about a pivot axis from a closed position for sealing the opening, to an open position for unloading the concrete reclaimer;

wherein the expandable hinge assembly further comprises a hinge pin that defines the pivot axis of the unloading door, and at least one slotted hinge bracket being attached to the reclaiming tank to slidably receive said hinge pin, said hinge pin being slidable in a direction substantially normal to the closed wall of the reclaiming tank.

7. A portable concrete reclaimer as recited in claim 6, wherein said separating screen is sloped toward the second receiving compartment so that large aggregate separated from waste concrete is channeled into the second receiving compartment.

8. A portable concrete reclaimer as recited in claim 7 wherein the separating screen is pivotable from a receiving position over the first receiving compartment where uncured waste concrete can be received, to an inverted dislodging position over the second receiving compartment where separated aggregate can be deposited in the second receiving compartment.

* * * * *